United States Patent
Ma et al.

(10) Patent No.: US 11,441,906 B2
(45) Date of Patent: *Sep. 13, 2022

(54) ITERATIVE ESTIMATION OF NON-HOLONOMIC CONSTRAINTS IN AN INERTIAL NAVIGATION SYSTEM

(71) Applicant: Apple Inc., Cupertino, CA (US)

(72) Inventors: Changlin Ma, San Jose, CA (US);
Isaac T. Miller, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/924,104

(22) Filed: Jul. 8, 2020

(65) Prior Publication Data

US 2020/0340814 A1    Oct. 29, 2020

Related U.S. Application Data

(63) Continuation of application No. 15/853,510, filed on Dec. 22, 2017.

(Continued)

(51) Int. Cl.
*G01C 21/28*    (2006.01)
*G01S 19/31*    (2010.01)
(Continued)

(52) U.S. Cl.
CPC ......... *G01C 21/165* (2013.01); *B60G 17/016* (2013.01); *B60R 21/0133* (2014.12); *G01C 21/28* (2013.01); *G01S 19/31* (2013.01); *G01S 19/393* (2019.08); *G01S 19/50* (2013.01); *B60G 2800/912* (2013.01); *B60R 2021/01327* (2013.01); *B60W 2050/0013* (2013.01)

(58) Field of Classification Search
CPC ....... G01C 21/28; G01C 21/165; G01S 19/31; G01S 19/50
See application file for complete search history.

(56) References Cited

U.S. PATENT DOCUMENTS 6,728,637 B2    4/2004    Ford et al.
7,222,007 B2    5/2007    Xu et al.
(Continued)

OTHER PUBLICATIONS

Dissanayake, "The aiding of a low-cost strapdown inertial measurement unit using vehicle model constraints for land vehicle applications," IEEE Transactions on Robotics and Automation, Oct. 2001, vol. 17, No. 5, pp. 731-747.

*Primary Examiner* — Tan Q Nguyen
(74) *Attorney, Agent, or Firm* — BakerHostetler

(57) ABSTRACT

A device implementing a system for estimating device location includes at least one processor configured to receive a first and second set of signals, each set corresponding to location data and being received based on a sampling interval. The at least one processor is configured to, for each sampling period defined by the sampling interval, obtain sensor data corresponding to device motion during the sampling period, determine an orientation of the device relative to that of the vehicle based on the sensor data, calculate a non-holonomic constraint based on the orientation of the device relative to that of the vehicle such that the non-holonomic constraint is iteratively updated, and estimate a device state based on the non-holonomic constraint.

20 Claims, 6 Drawing Sheets

Related U.S. Application Data

(60) Provisional application No. 62/556,286, filed on Sep. 8, 2017.

(51) Int. Cl.
    *G01C 21/16*     (2006.01)
    *B60G 17/016*     (2006.01)
    *B60R 21/0132*     (2006.01)
    *G01S 19/39*     (2010.01)
    *G01S 19/50*     (2010.01)
    *B60W 50/00*     (2006.01)

(56) References Cited

U.S. PATENT DOCUMENTS

| | | |
|---|---|---|
| 7,266,477 B2 | 9/2007 | Foessei |
| 7,421,340 B2 | 9/2008 | Ladetto |
| 7,453,553 B2 | 9/2008 | Yokokohji et al. |
| 8,510,041 B1 * | 8/2013 | Anguelov ............... G01C 21/32 701/445 |
| 9,121,940 B2 | 9/2015 | Psiaki et al. |
| 9,250,327 B2 | 2/2016 | Kelley et al. |
| 9,366,540 B2 | 6/2016 | Chien |
| 9,728,637 B2 | 8/2017 | Jeng et al. |
| 2010/0019963 A1 | 1/2010 | Gao et al. |
| 2012/0197587 A1 | 8/2012 | Luk |
| 2015/0247729 A1 * | 9/2015 | Meduna ............... G01C 21/165 702/150 |
| 2016/0033366 A1 | 2/2016 | Liu |

\* cited by examiner

ITERATIVE ESTIMATION OF NON-HOLONOMIC CONSTRAINTS IN AN INERTIAL NAVIGATION SYSTEM

CROSS-REFERENCE TO RELATED APPLICATIONS

The present application is a continuation of U.S. patent application Ser. No. 15/853,510, entitled "ITERATIVE ESTIMATION OF NON-HOLONOMIC CONSTRAINTS IN AN INERTIAL NAVIGATION SYSTEM," filed Dec. 22, 2017, which claims the benefit of U.S. Provisional Patent Application Ser. No. 62/556,286, entitled "ITERATIVE ESTIMATION OF NON-HOLONOMIC CONSTRAINTS IN AN INERTIAL NAVIGATION SYSTEM," filed Sep. 8, 2017, which is hereby incorporated herein by reference in its entirety and made part of the present U.S. Utility Patent Application for all purposes.

TECHNICAL FIELD

The present description relates generally to estimating the location of a device, including iteratively estimating non-holonomic constraints in an inertial navigation system.

BACKGROUND

An electronic device such as a laptop, tablet, smart phone or a wearable device may include a Global Navigation Satellite System (GNSS) receiver and one or more sensors (e.g., an accelerometer, a gyroscope) which can be used in conjunction with each other to estimate the location of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides for estimating the location of an electronic device within or coupled to a vehicle in motion. While the vehicle is in motion (e.g., for the duration of a trip), the subject system obtains signals corresponding to location data (e.g., via a GNSS receiver), and employs an inertial navigation system (INS) which uses sensors to continuously calculate device state (e.g., position, orientation and velocity) to supplement a location estimation determined from the signals corresponding to location data.

To improve the estimated location of the device, the subject system determines an orientation of the electronic device relative to that of the vehicle. The subject system calibrates the orientation iteratively, for example, on a per-epoch basis (e.g., corresponding to measurement intervals of the GNSS receiver). The subject system determines and applies a non-holonomic constraint, also in an iterative manner, based on the orientation. The iterative application of the non-holonomic constraint may improve estimation of the device state while the vehicle is in motion, thereby resulting in a more accurate estimate of device location.

Figure 1:
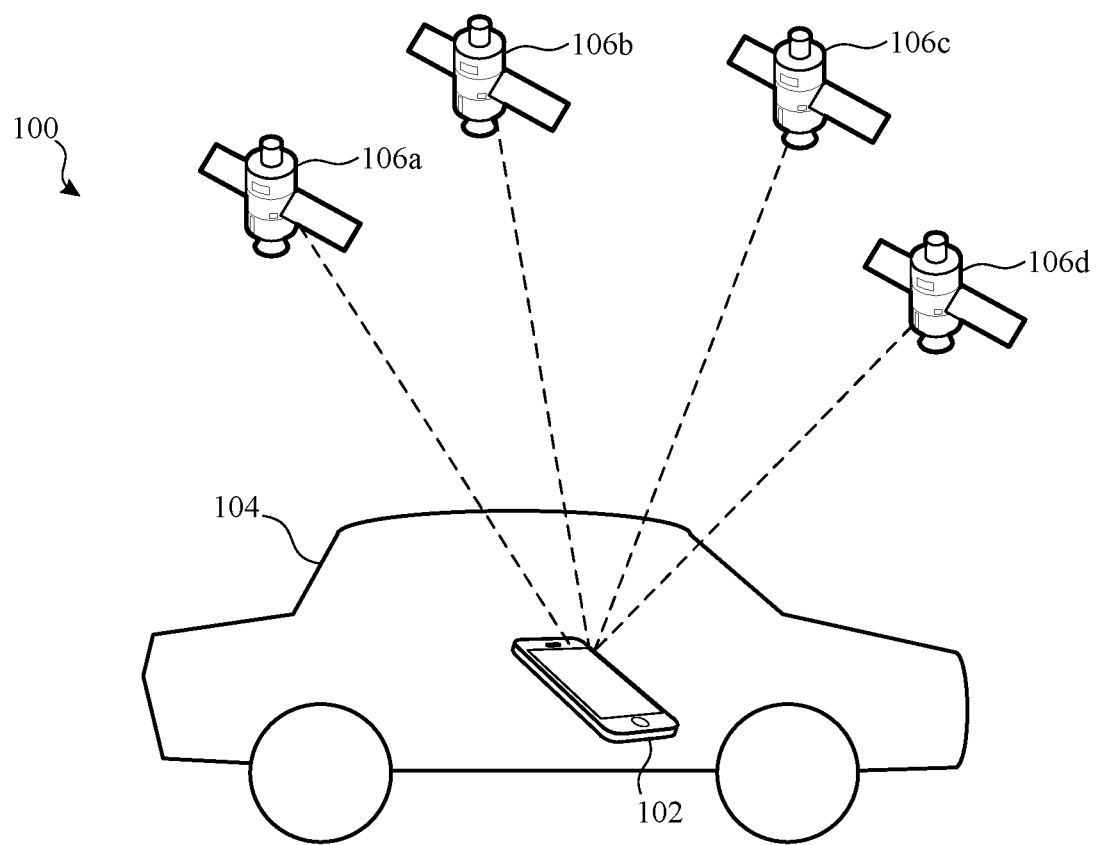
FIG. 1 illustrates an example positioning system in which an electronic device may implement the subject system in accordance with one or more implementations.

FIG. 1 illustrates an example positioning system in which an electronic device may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The positioning system 100 includes the electronic device 102 and GNSS satellites 106a, 106b, 106c and 106d, hereinafter "106a-106d". For explanatory purposes, the positioning system 100 is illustrated in FIG. 1 as including the electronic device 102 and the four GNSS satellites 106a-106d; however, the positioning system 100 may include any number of electronic devices and any number of GNSS satellites. Other positioning technologies may be used independent of or in conjunction with GNSS technology to determine device location. Examples of such positioning technologies include, but are not limited to, Wi-Fi positioning, cellular phone signal positioning, Bluetooth signal positioning and/or image recognition positioning.

The positioning system 100 may be used for estimating the position of the electronic device 102. In one or more implementations, the electronic device 102 is positioned within a vehicle 104 in motion, and the position of the electronic device 102 is continuously updated while the vehicle 104 is in motion (e.g., for the duration of a trip). The vehicle 104 may be a land vehicle such as an automobile, a motorcycle, a bicycle or a skateboard, or may be a watercraft, an aircraft or any other appropriate vehicle for travel. In FIG. 1, by way of example, the vehicle 104 is depicted as an automobile.

The positioning system 100 allows the electronic device 102 to determine its location based on signals received from GNSS satellites 106a-106d. For example, the positioning system 100 allows the electronic device 102 to determine its location (e.g., longitude, latitude, and altitude/elevation) using signals transmitted along a line of sight by radio from GNSS satellites 106a-106d. Alternatively or in addition, the location of the electronic device 102 may be determined based on the strength of signals received by the electronic device 102 from wireless access points (e.g., Wi-Fi), which may have known locations, or using other positioning technologies (e.g., cellular phone signal, Bluetooth signal and/or image recognition).

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 6.

Figure 2:
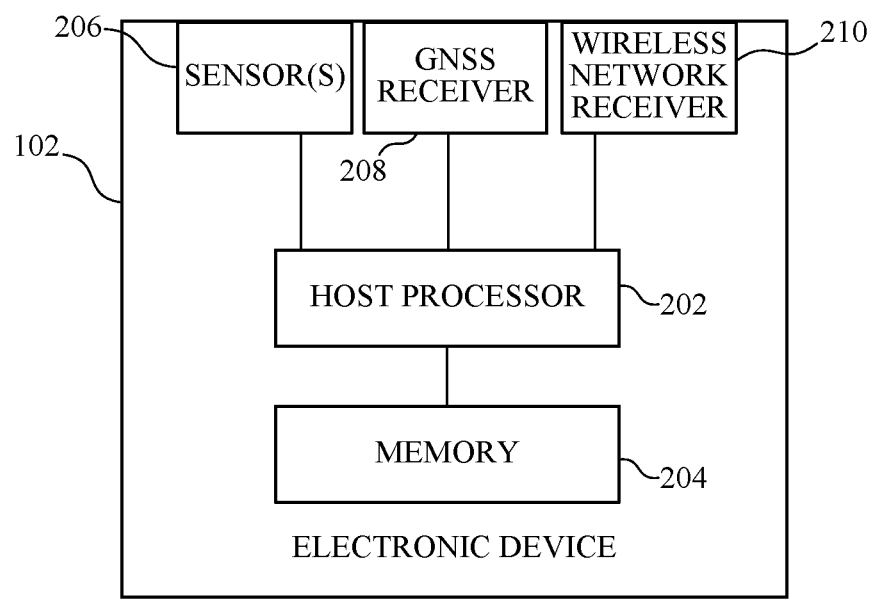
FIG. 2 illustrates an example electronic device that may implement the subject system in accordance with one or more implementations.

FIG. 2 illustrates an example electronic device 102 that may implement the subject system in accordance with one or more implementations. For example, the electronic device 102 can correspond to the electronic device from FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, sensor(s) 206, a GNSS receiver 208 and wireless network receiver 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may implement an operating system or may otherwise execute code to manage operations of the electronic device 102. In the subject system, the host processor 202 may implement a software architecture for a location estimator that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store values for sensor signal measurements, GNSS receiver data, constraint data, device state estimates, and/or device location estimates, for example, based on motion of the electronic device 102.

Sensor(s) 206 may include one or more motion sensor(s), such as an accelerometer and/or a rate gyroscope. The motion sensor(s) may be used to facilitate movement and orientation related functions of the electronic device 102, for example, to detect movement, direction and orientation of the device.

Alternatively or in addition, sensor(s) 206 may include one or more of an electronic magnetometer, a barometer, an optical sensor, or generally any sensor that may be used to facilitate a positioning system. The electronic magnetometer (e.g., an integrated circuit chip) may provide data used to determine the direction of magnetic North, for example to be used as an electronic compass. The barometer may be utilized to detect atmospheric pressure, which can be used in determining altitude of the electronic device 102. The optical sensor can be part of a camera system, and may be utilized to facilitate camera functions, such as recording photographs and video clips.

The GNSS receiver 208 may provide for geo-referencing. In one or more implementations, the GNSS receiver 208 may include an antenna, for receiving GNSS signals from one or more positioning satellites (e.g., the GNSS satellites 106a-106d). For example, the GNSS receiver 208 may be compatible with one or more of Global Positioning System (GPS), Globalnaya Navigazionnaya Sputnikovaya Sistema (GLONASS), the Galileo positioning system, and/or generally any positioning system.

The wireless network receiver 210 may provide wireless connectivity for the electronic device 102. In one or more implementations, the wireless network receiver 210 may include an antenna, for wireless signals from wireless access points. For example, the wireless network receiver 210 may be compatible with Wi-Fi or other types of wireless networking.

In one or more implementations, one or more of the host processor 202, the memory 204, the one or more sensor(s) 206, the GNSS receiver 208, the wireless network receiver 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
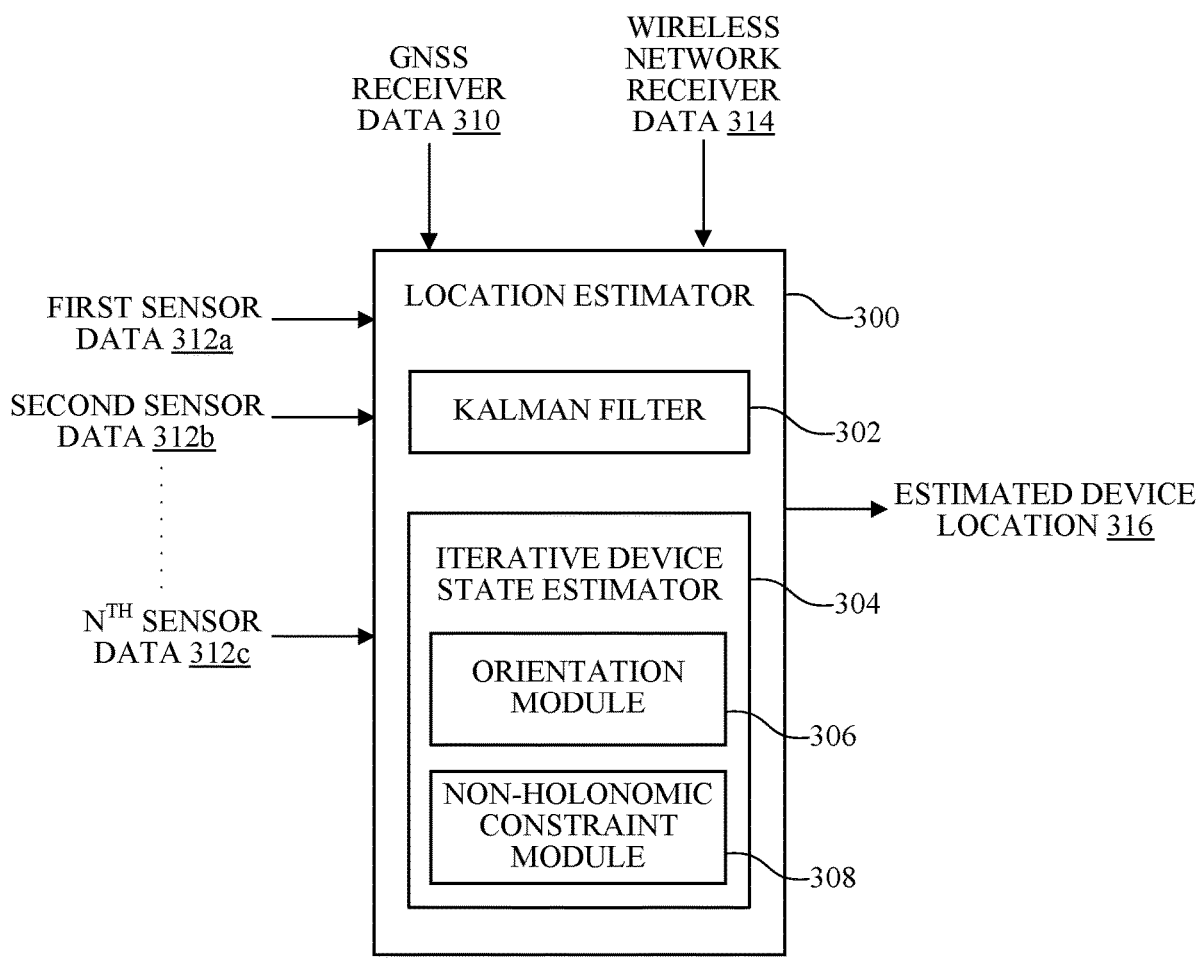
FIG. 3 illustrates an example of a location estimator of the subject system that may be implemented by an electronic device in accordance with one or more implementations.

FIG. 3 illustrates an example of a location estimator 300 of the subject system that may be implemented by an electronic device in accordance with one or more implementations. For example, the location estimator 300 can be implemented by one or more software modules running on the host processor 202 of the electronic device 102 of FIGS. 1-2. In another example, the location estimator 300 can be implemented by custom hardware (e.g., one or more coprocessors) configured to execute the functionality of the location estimator 300. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The location estimator 300 may include a Kalman filter 302 and an iterative device state estimator 304. The iterative device state estimator 304 may include an orientation module 306 and a non-holonomic constraint module 308.

The location estimator 300 may receive sensor data (e.g., the first sensor data 312a, the second sensor data 312b, . . . , and the $N^{th}$ sensor data 312c, hereinafter "the sensor data 312a-312c"), GNSS receiver data 310 and wireless network receiver data 314 as input, and may provide an estimated device location 316 as output. In one or more implementations, the sensor data 312a-312c may be received from the sensor(s) 206, the GNSS receiver data 310 may be received from the GNSS receiver 208, and the wireless network receiver data 314 may be received from the wireless network receiver 210.

However, computing an accurate position solution (e.g., an estimated device location) in a positioning system (e.g., a GNSS positioning system) can be difficult in certain circumstances. For example, challenging signal environments such as urban canyons and areas of dense foliage can make computing an accurate position solution difficult. In these environments, fewer signals are available, and those signals that are available tend to yield less accurate measurements on a device due to environmental attenuation.

To improve the availability and quality of position solutions in challenging signal environments, the location estimator 300 may use the GNSS receiver data 310 (from GNSS receiver 208) and/or the wireless network receiver data 314 (from wireless network receiver 210) to determine an initial reference location for the electronic device 102. In one example, the initial reference location may be determined based on the strength of signals received by the electronic device 102 from Wi-Fi access points with known locations. In addition, the location estimator 300 may use sensor data 312a-312c (from sensor(s) 206) to supplement the initial reference location, thereby improving the position solution. For example, accelerometer measurements corresponding to acceleration of the electronic device 102, and/or gyroscope measurements corresponding to rotation rates of the electronic device 102, may be used to estimate device state (e.g., position, orientation and velocity) to supplement the initial reference location.

The measurement (or sampling) interval of the GNSS receiver 208 may be referred to as an epoch. Antenna motion (e.g., corresponding to motion resulting from movement of the electronic device 102) indicated by the sensor data 312a-312c over multiple epochs of measurements accumulates over time. Some types of antenna motion may be desirable, for example, where the electronic device 102 moves by virtue of the electronic device being in the vehicle 104 in motion. However, other antenna motion may be undesirable. For example, the electronic device 102 may move within the vehicle 104 itself (e.g., due to sliding, flipping, rotating or falling within the vehicle 104), and this type of motion does not correspond to the travel direction of the vehicle 104. Since antenna motion over multiple epochs of measurements accumulates over time, such undesirable antenna motion (e.g., motion other than the electronic device 102 moving by virtue of being in the vehicle 104) may degrade the position solution. Accordingly, in the subject system, the location estimator 300 may subtract out undesirable antenna motion indicated by the sensor data 312a-312c between epochs of GNSS measurements corresponding to GNSS receiver data 310, to improve the location estimate.

The location estimator 300 may implement a Kalman filter 302. The Kalman filter 302 corresponds to an algorithm that uses a series of measurements observed over time, containing statistical noise and other inaccuracies, and produces estimates of unknown variables that tend to be more accurate than those based on a single measurement alone. Thus, to improve the availability and quality of position solutions, measurements of GNSS receiver signals (e.g., the GNSS receiver data 310) may be used in the Kalman filter 302 with numerical integration of sensor measurements (e.g., the sensor data 312a-312c) to correct for undesirable antenna motion between epochs. In one or more implementations, the numerical integration component may be referred to as an inertial navigation system (INS).

Thus, the location estimator 300 may subtract out the undesirable antenna motion between the epochs, so that multiple epochs of GNSS measurements may be combined without being impacted by errors introduced by the undesirable antenna motion. The location estimator 300 may introduce one or more motion constraints, corresponding to particular direction(s) in which motion typically does not occur or in which motion is limited. In doing so, the location estimator 300 may disregard or otherwise limit signal measurements corresponding to undesirable motion (e.g., based on constraints derived from device orientation).

In particular, location estimator 300 includes the iterative device state estimator 304, which in turn includes the orientation module 306 and the non-holonomic constraint module 308. When the electronic device 102 is within or otherwise coupled to a vehicle 104 in motion, the orientation module 306 iteratively determines and calibrates an orientation of the electronic device 102 with respect to the vehicle while in motion (e.g., for the duration of a trip). The calibration is iterative in the sense the orientation may be calibrated at every epoch.

The orientation module 306 determines the orientation of the electronic device 102 relative to that of the vehicle, by determining at least two vectors for the electronic device 102 and a corresponding at least two vectors for the vehicle 104. For the electronic device 102, each of the vectors corresponds to a respective direction relative to an orientation of the electronic device 102. For the vehicle 104, each of the vectors corresponds to a respective direction relative an orientation of the vehicle 104.

For example, the orientation module 306 may determine a first vector corresponding to a direction of gravity for each of the electronic device 102 and the vehicle 104. Further, the orientation module 306 may determine a second vector corresponding to a direction of travel for each of the electronic device 102 and the vehicle 104.

For the first vector of the electronic device 102, the direction of gravity relative to an orientation of the electronic device 102 may be estimated using an accelerometer of the electronic device 102 (e.g., one of sensor(s) 206). For example, an accelerometer relative to the Earth's surface may indicate an upward force, because any point on the Earth's surface is accelerating upwards relative to the local inertial frame. The direction of gravity would be in the opposite, downward direction. Thus, the orientation module 306 may determine the first vector for the electronic device, where the first vector corresponds to the direction of gravity relative to the orientation of the electronic device 102.

Further, the orientation module 306 may determine a corresponding first vector for the vehicle 104. In particular, the first vector for the vehicle 104 may correspond to the direction of gravity relative to the orientation of the vehicle 104. In this regard, when the vehicle 104 is in motion, the orientation module 306 may predetermine that the direction of gravity with respect to the orientation of the vehicle 104 is the downward direction. Since the direction of gravity is known (e.g., from the accelerometer of the electronic device 102), the orientation module 306 can determine the orientation of the vehicle 104 with respect to gravity based on the assumption that gravity is pointing down for the vehicle. Thus, the first vector can be determined for the vehicle 104.

Furthermore, the orientation module 306 determines the second vector corresponding to the direction of travel for both the electronic device 102 and the vehicle 104. The direction of travel relative to the orientation of the electronic device 102 may be estimated using the accelerometer of the electronic device 102. For example, the accelerometer may indicate the forward direction of the vehicle while the electronic device 102 is within or coupled to the vehicle 104 in motion. Since the electronic device 102 may be oriented in any manner, it may not be oriented in line with the forward direction of the vehicle as indicated by the accelerometer. Thus, the orientation module 306 may determine the second vector for the electronic device, where the second vector corresponds to the direction of travel (e.g., forward) relative to the orientation of the electronic device 102.

Further, the orientation module 306 may determine a corresponding second vector for the vehicle 104. In particular, the second vector for the vehicle 104 may correspond to the direction of travel relative to the orientation of the vehicle 104. In this regard, when vehicle 104 is in motion, the orientation module 306 may determine that the direction of travel with respect to the vehicle 104 is the forward direction. Since the direction of travel is known (e.g., from the accelerometer of the electronic device 102), the orientation module 306 can determine the orientation of the vehicle 104 with respect to the direction of travel based on the assumption the vehicle is traveling forward. Thus, the second vector can be determined for the vehicle 104.

Alternatively, or in addition, the direction of travel may be obtained using a magnetometer of the electronic device 102. For example, the magnetometer can be used to obtain an orientation of device relative to an absolute coordinate frame, in order to determine the direction of travel. In another example, the direction of travel may be obtained using an optical sensor of the electronic device 102 (e.g., corresponding to a device camera). In this regard, the direction of travel may be obtained using image processing techniques, based on successive images captured by the optical sensor as the vehicle travels. If the magnetometer or the optical sensor are used to determine a vector for the direction of travel, at least one additional vector (e.g., direction of gravity) would be needed to determine the orientation of the electronic device 102 relative to that of the vehicle 104, as described above.

Besides the direction of gravity and the direction of travel, the orientation module 306 may use other vectors corresponding to directions relative to the orientations of the electronic device 102 and the vehicle 104. These vectors include, but are not limited to, a centrifugal direction or a rotation direction. For example, the centrifugal direction and/or the rotation direction may be determined based on sensor measurements from a gyroscope of the electronic device 102.

Moreover, while the above examples describe the use of two vectors (the first and second vectors), it is possible to use more than two vectors, and this may lead to a more accurate determination of the orientation of the electronic device 102 with respect to the vehicle 104. As such, once at least two vectors are obtained for each of the electronic device 102 and the vehicle 104, the orientation module 306 may determine the orientation of the electronic device 102 relative to that of the vehicle 104, for example, using standard vector analysis techniques for orienting the frames of objects with respect to each other.

Thus, the orientation module 306 determines the orientation of the electronic device 102 with respect to the vehicle 104, and iteratively calibrates such orientation, for example, by determining the orientation on a per-epoch basis. By iteratively determining and calibrating the orientation, the iterative device state estimator 304 may more accurately determine non-holonomic constraint(s).

In this regard, the non-holonomic constraint module 308 estimates and applies non-holonomic constraint(s) in association with device sensor measurements. For example, the non-holonomic constraint(s) may be applied to position/state estimates derived from sensor measurements. One example of a non-holonomic constraint corresponds to the no-slip direction. In the case where the electronic device 102 is inside of or otherwise coupled to the vehicle 104 in motion, the non-holonomic constraint module 308 may limit or otherwise disregard/eliminate measurements corresponding to sideslip. Sideslip corresponds to unintended sideways travel of the vehicle 104 relative to the direction in which the vehicle 104 is pointing (e.g., due to slippage or incorrect wheel alignment). Specifically, the non-holonomic constraint can be based on the assumption that all vehicle speed is in the direction that the vehicle is tracking, and that there is no sideslip for the vehicle. The non-holonomic constraint module 308 would thus assume a cross-track speed (e.g., corresponding to vehicle speed which is perpendicular to the tracking direction) of zero, by disregarding sensor measurements in the no-slip direction. The non-holonomic constraint module 308 is not limited to the example of the no-slip direction, and other non-holonomic constraints may be used to effectively limit motion (e.g., by disregarding or limiting sensor measurements corresponding to motion in a particular direction).

Regarding the estimation of the no-slip direction, the non-holonomic constraint module 308 may determine such an estimate in order to reduce accumulated error. As noted above, an INS may estimate motion from one epoch to the next. As such, errors may accumulate over time as that motion is combined over multiple epochs. Because of such accumulation, if a value associated with the constraint is inaccurate, a motion constraint may harm, rather than help a positioning solution.

In one or more implementations, the non-holonomic constraint module 308 estimates and applies non-holonomic constraint(s), by iteratively updating non-holonomic constraint(s). In particular, by virtue of the device-to-vehicle orientation being calibrated iteratively, the non-holonomic constraint module 308 may estimate values for a non-holonomic constraint in an iterative manner (e.g., by determining the no-slip direction on a per-epoch basis). In this regard, the iterative updates to the non-holonomic constraint(s) can be applied as updates to the Kalman filter 302. As noted above, the Kalman filter 302 may use a series of measurements observed over time, containing statistical noise and other inaccuracies, and to produce estimates of unknown variables that tend to be more accurate than those based on a single measurement alone. Thus, by estimating values for a non-holonomic constraint (e.g., the no-slip direction) in an iterative manner, and applying corresponding updates to the Kalman filter 302, it is possible to improve estimation of the device state (e.g., the position, orientation and/or velocity of the electronic device 102 from the initial reference location). The improved estimation of the device state can result in improved estimation of the device location.

As noted above, the orientation module 306 may determine the orientation of the electronic device 102 with respect to the vehicle 104 on a per-epoch basis. However, in one or more alternative implementations, the orientation module 306 may instead determine the orientation of the electronic device if a threshold change in device state (e.g., position, orientation and velocity) is detected. For example, one or more of the sensor(s) 206 (e.g., the gyroscope and/or accelerometer) may detect a threshold change in position, orientation and/or velocity, due to sliding, flipping, rotating and/or falling of the electronic device 102 within the vehicle 104. In response to detecting the threshold change, the orientation module 306 may at that time determine the orientation of the electronic device 102 with respect to the vehicle 104. The non-holonomic constraint module may likewise update the non-holonomic constraint(s) based on these detected changes (e.g., instead of on a per-epoch basis), and these updates may be provided to the Kalman filter 302 at the respective times. Moreover, the updates to the Kalman filter 302 may be weighted, so as to reduce the impact in estimating device state due to a sudden and temporary threshold change in device state is detected.

In one or more implementations, the location estimator 300, including the Kalman filter 302 and the iterative device state estimator 304 (which includes the orientation module 306 and the non-holonomic constraint module 308), are implemented as software instructions, stored in the memory 204, which when executed by the host processor 202, cause the host processor 202 to perform particular function(s).

In one or more implementations, one or more of the location estimator 300, the Kalman filter 302, the iterative device state estimator 304, the orientation module 306 and the non-holonomic constraint module 308 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
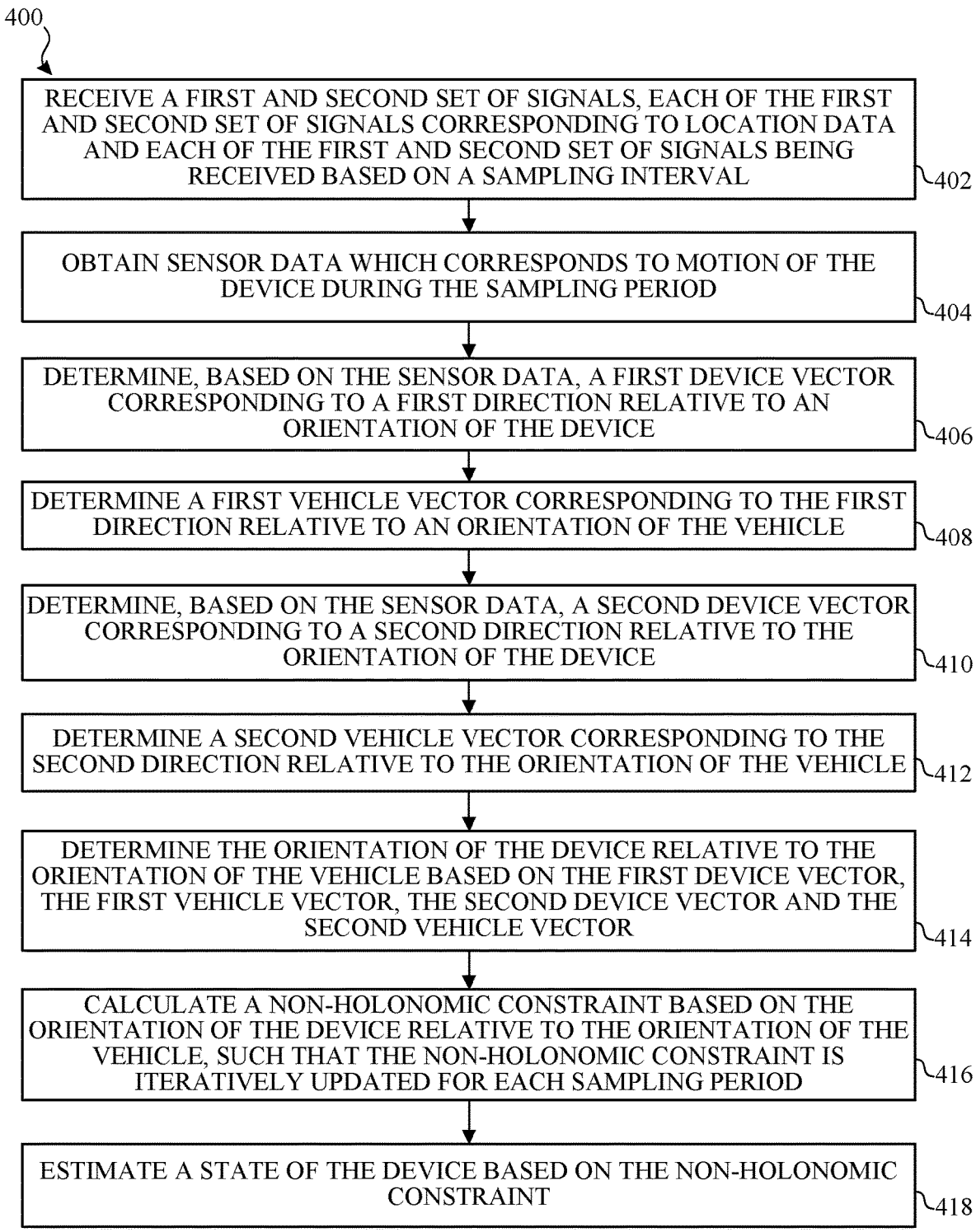
FIG. 4 illustrates a flow diagram of an example process for estimating the location of an electronic device based on iterative estimation of a non-holonomic constraint in accordance with one or more implementations.

FIG. 4 illustrates a flow diagram of an example process for estimating the location of an electronic device based on iterative estimation of a non-holonomic constraint in accordance with one or more implementations. For explanatory purposes, the process 400 is primarily described herein with reference to the electronic device 102 of FIGS. 1-2. However, the process 400 is not limited to the electronic device 102, and one or more blocks (or operations) of the process 400 may be performed by one or more other components of the electronic device 102.

Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

An electronic device 102 may be positioned within or coupled to a vehicle 104 in motion. The electronic device 102 receives a first and second set of signals, each of the first and second set of signals corresponding to location data and each of the first and second set of signals being received based on a sampling interval (402). The plural sets of signals may correspond to at least one of Global Navigation Satellite System (GNSS) signals, wireless network signals, beaconing signals, or generally any signals from which location data can be derived.

For each sampling period defined by the sampling interval, the electronic device 102 obtains sensor data which corresponds to motion of the device during the sampling period (404). The electronic device 102 determines, based on the sensor data, a first device vector corresponding to a first direction relative to an orientation of the device (406). For example, the first direction may be a direction of gravity, such that the first device vector corresponds to the direction of gravity relative to the orientation of the device. The electronic device 102 also determines a first vehicle vector corresponding to the first direction relative to an orientation of the vehicle (408). For example, if the first direction is the direction of gravity, the first vehicle vector would correspond to the direction of gravity relative to the orientation of the vehicle. The direction of gravity relative to the orientation of the vehicle may be predetermined as a downward direction.

For each sampling period defined by the sampling interval, the electronic device 102 determines, based on the sensor data, a second device vector corresponding to a second direction relative to the orientation of the device (410). For example, the second direction may be a direction of travel, such that the second device vector corresponds to the direction of travel relative to the orientation of the device. The electronic device 102 also determines a second vehicle vector corresponding to the second direction relative to the orientation of the vehicle (412). For example, if the second direction is the direction of travel, the second vehicle vector would correspond to the direction of travel relative to the orientation of the vehicle. The direction of travel relative to the orientation of the vehicle may correspond to a forward direction.

The sensor data may be obtained by an accelerometer of the device, and the first device vector and the second device vector may be determined based on the sensor data as obtained by the accelerometer. Alternatively, the sensor data may obtained by a first sensor and a second sensor of the device, the first device vector being determined based on the sensor data as obtained by the first sensor, and the second device vector being determined based on the sensor data as obtained by the second sensor. The first and second sensors may be different sensors selected from an accelerometer, a gyroscope or a magnetometer of the device.

For each sampling period defined by the sampling interval, the electronic device 102 determines the orientation of the device relative to the orientation of the vehicle based on the first device vector, the first vehicle vector, the second device vector and the second vehicle vector (414). For each sampling period, the electronic device 102 calculates a non-holonomic constraint based on the orientation of the device relative to the orientation of the vehicle, such that the non-holonomic constraint is iteratively updated for each sampling period (416). For example, calculating the non-holonomic constraint based on the orientation of the device relative to that of the vehicle is discussed further below with respect to FIG. 5.

The non-holonomic constraint may correspond to a no-slip direction for the vehicle, such that sensor measurements corresponding to sideslip of the vehicle are disregarded or limited. The electronic device 102 may further calculate a covariance matrix based on the sensor data, calculate a singular value decomposition based on the covariance matrix, and determine an estimate for the no-slip direction based on the calculated singular value decomposition. Calculating the non-holonomic constraint may include iteratively updating, using a filter, the non-holonomic constraint as the orientation of the device relative to the orientation of the vehicle is determined for each set of signals.

The electronic device 102 estimates a state of the device based on the non-holonomic constraint (418). As noted above, measurements of GNSS receiver signals (e.g., the GNSS receiver data 310) may be used in the Kalman filter 302 with numerical integration of sensor measurements (e.g., the sensor data 312a-312c). Further, the non-holonomic constraint(s) are updated iteratively, and these iterative updates can be applied to the Kalman filter 302 in estimating the device state.

Estimating the state of the device may further be based on second sensor data subsequently obtained by the electronic device 102. The state of the device may be estimated using an inertial navigation system, the inertial navigation system supplementing a location estimation determined from the plural sets of received signals. The electronic device 102 may further estimate its location based on the estimated state of the device and on a third set of signals, corresponding to location data, subsequently received by the electronic device 102. For example, as GNSS receiver data 310 is received, the estimated device states may be used to supplement the location estimates derived from the received GNSS receiver data 310.

Figure 5:
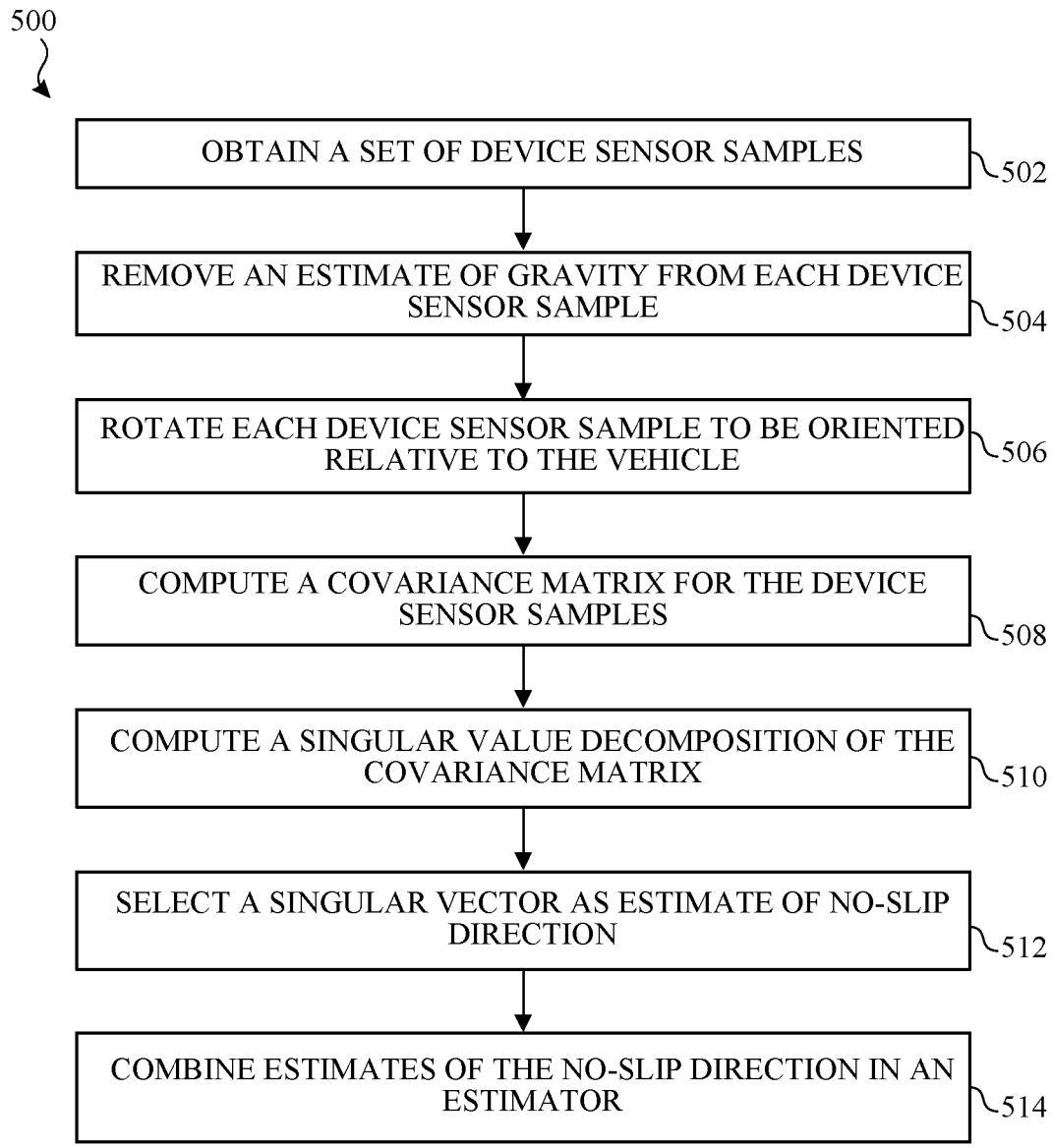
FIG. 5 illustrates a flow diagram of an example process for iteratively estimating a no-slip direction in accordance with one or more implementations.

FIG. 5 illustrates a flow diagram of an example process for iteratively estimating a no-slip direction in accordance with one or more implementations. For explanatory purposes, the process 500 is primarily described herein with reference to the electronic device 102 of FIGS. 1-2. However, the process 500 is not limited to the electronic device 102, and one or more blocks (or operations) of the process 500 may be performed by one or more other components of the electronic device 102. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 corresponds to an example of determining a non-holonomic constraint corresponding to the no-slip direction. For example, the process 500 can be performed by the electronic device 102 when it is inside of or otherwise coupled to the vehicle 104 in motion. The electronic device 102 may use non-holonomic constraint(s) in order to more accurately estimate a state the electronic device 102, thereby improving location estimation as described above with reference to FIGS. 1-4.

The electronic device 102 obtains a set of device sensor samples (502). For example, the set of device sensor samples can correspond to a batch of accelerometer samples for the electronic device 102 obtained over multiple epochs.

The electronic device 102 removes an estimate of gravity from each device sensor sample (504). Gravity can be estimated, for example, via the accelerometer with respect to the frame of the electronic device 102. By removing the gravity estimate, the samples correspond to a more accurate acceleration of the vehicle in motion.

The electronic device 102 rotates each device sensor sample to so as to be expressed in a common electronic device 102 coordinate frame, rather than being oriented in different electronic device 102 coordinate frames as when originally sampled. For example, each accelerometer sample can be rotated to a common electronic device 102 coordinate frame, based on data obtained from device gyroscopes and/or estimates of device attitude.

The electronic device 102 computes a covariance matrix for the device sensor samples (508), and the electronic device 102 computes a singular variance decomposition of the covariance matrix (510). The singular variance decomposition generates multiple vectors from which one of more of the direction of travel, the direction of gravity, and the no-slip direction can be selected.

As noted above, an estimate of gravity was removed at step 504. However, this estimate of gravity may contain estimation errors. In this regard, acceleration in the vertical direction is still allowed by suspension travel. As such, this acceleration may be detected as residual acceleration in the vertical direction.

In one or more implementations, the singular vector generated by the singular variance decomposition with the strongest singular value may correspond to the direction of travel. For example, the singular value decomposition will typically detect vehicle accelerations in the direction of travel as having the largest singular vector, as these are typically unconstrained. The no-slip direction and the gravity direction will have weaker singular values because motion is restricted in these directions by tire friction and vehicle suspension, respectively, but the motion in these two directions typically will not be equal to zero.

For example, the singular vector with the weakest signal value may correspond to the direction of gravity, having had gravity already subtracted out, and the singular vector in the middle may be used as the estimate of the direction of the no-slip direction. In one or more implementations, if the vehicle is a small car or motorcycle traveling on gravel or dirt, the sideslip vector may be larger than the direction of travel vector.

Alternatively, the singular vector with the weakest signal value may be used as the estimate of the no-slip direction, and the middle value may be used as the estimate of the direction of gravity. For example, if the vehicle is a large truck traveling on a paved road, the sideslip vector may be smaller than the gravity vector. Accordingly, the electronic device 102 selects a singular vector as an estimate of the no-slip direction, for example, based on vehicle type and road conditions (512).

The electronic device 102 combines the estimates of the no-slip direction in an estimator (514), for example, using a filter. As noted above, the electronic device 102 may determine a non-holonomic constraint based on the no-slip direction for improved estimation of device state. Thus, by combining and averaging the estimates of the no-slip direction in an iterative manner, it is possible to obtain improved estimation of device state. In turn, the improved estimation of device state may be used to improve estimates of device location.

Figure 6:
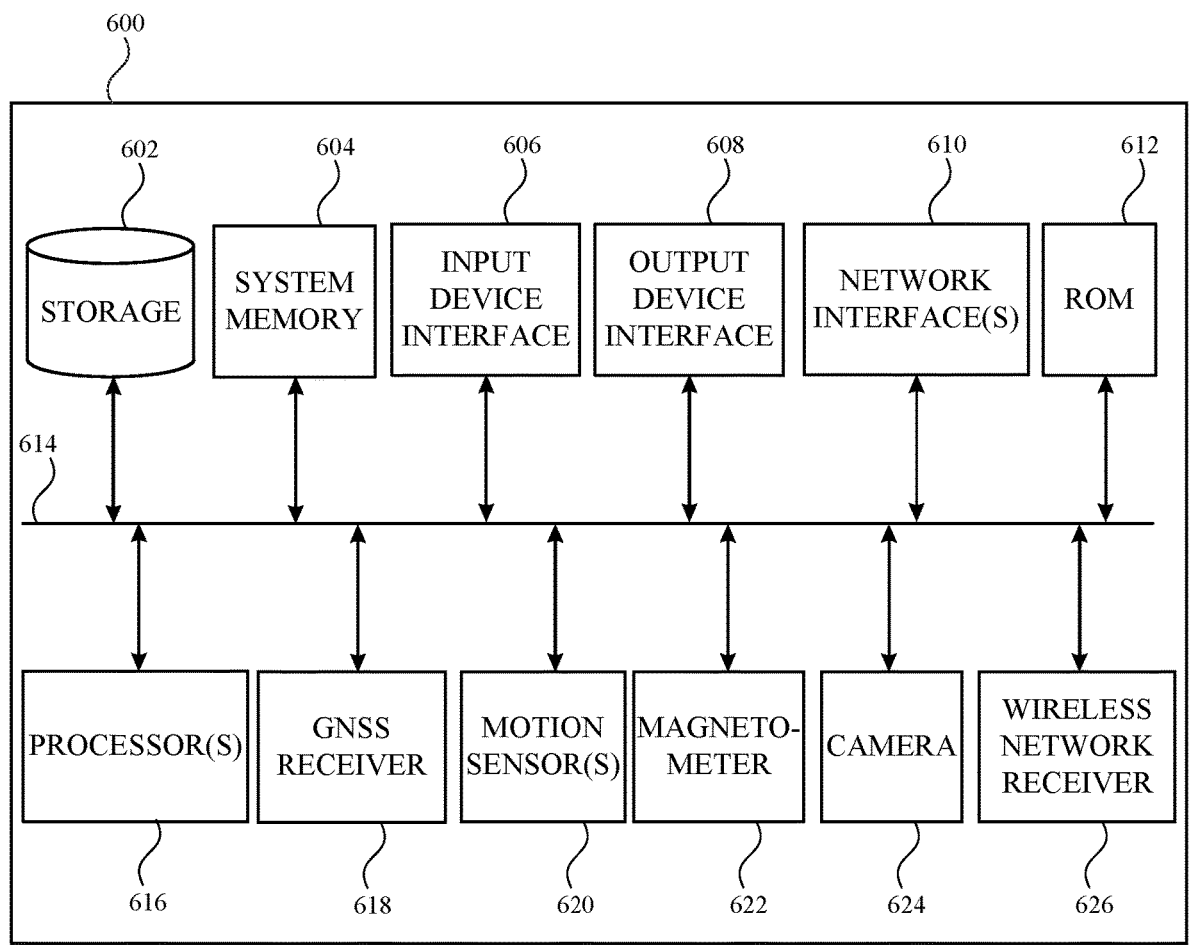
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, any electronic device for generating the features and processes described in reference to FIGS. 1-5, including but not limited to a laptop computer, tablet computer, smart phone, and wearable device (e.g., smart watch, fitness band). The electronic system 600 may include various types of computer readable media and interfaces for various other types of computer readable media. The electronic system 600 includes a bus 614, one or more processing unit(s) 616, a system memory 604 (and/or buffer), a ROM 612, a permanent storage device 602, an input device interface 606, an output device interface 608, and one or more network interface(s) 610, or subsets and variations thereof.

The bus 614 collectively represents all system, peripheral, and chipset buses that communicatively connect the numerous internal devices of the electronic system 600. In one or more implementations, the bus 614 communicatively connects the one or more processing unit(s) 616 with the ROM 612, the system memory 604, and the permanent storage device 602. From these various memory units, the one or more processing unit(s) 616 retrieves instructions to execute and data to process in order to execute the processes of the subject disclosure. The one or more processing unit(s) 616 can be a single processor or a multi-core processor in different implementations.

The ROM 612 stores static data and instructions that are needed by the one or more processing unit(s) 616 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 616 may need at runtime. In one or more implementations, the processes of the subject disclosure are stored in the system memory 604, the permanent storage device 602, and/or the ROM 612. From these various memory units, the one or more processing unit(s) 616 retrieves instructions to execute and data to process in order to execute the processes of one or more implementations.

The bus 614 also connects to the input and output device interfaces 606 and 608. The input device interface 606 enables a user to communicate information and select commands to the electronic system 600. Input devices that may be used with the input device interface 606 may include, for example, alphanumeric keyboards and pointing devices (also called "cursor control devices"). The output device interface 608 may enable, for example, the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus also connects to a GNSS receiver 618, a motion sensor(s) 620, an electronic magnetometer 622, a camera 624 and a wireless network receiver 626, to facilitate multiple functionalities. In one or more implementations, the motion sensor(s) 620 may facilitate orientation functions of the device. For example, the motion sensor(s) 620 (e.g., an accelerometer and/or a rate gyroscope) may be utilized to detect movement, travel and orientation of the device.

The GNSS receiver 618 may provide for geo-referencing. The wireless network receiver 626 may provide for receiving signals from wireless access points. The electronic magnetometer 622 (e.g., an integrated circuit chip) may provide data used to determine the direction of magnetic North. Thus, the electronic magnetometer 622 may be used as an electronic compass.

The camera 624 may include an optical sensor such as a charged coupled device (CCD) or a complementary metal-oxide semiconductor (CMOS) optical sensor. The camera 624 may be utilized to facilitate camera functions, such as recording photographs and video clips.

Finally, as shown in FIG. 6, the bus 614 also couples the electronic system 600 to one or more networks and/or to one or more network nodes through the one or more network interface(s) 610. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving, at a sampling interval and by a device within or coupled to a vehicle in motion, a set of signals corresponding to location data; and
    for at least one sampling period defined by the sampling interval,
        obtaining first sensor data which corresponds to motion of the device during the at least one sampling period,
        determining an orientation of the device relative to an orientation of the vehicle based on the first sensor data, and
        estimating a state of the device based at least in part on the orientation of the device relative to the orientation of the vehicle.

2. The method of claim 1, wherein the estimating is further based at least in part on a constraint on a portion of the first sensor data.

3. The method of claim 2, wherein the portion of the first sensor data comprises sensor data corresponding to motion in a particular direction.

4. The method of claim 3, wherein the particular direction is a sideslip direction of the vehicle.

5. The method of claim 4, wherein the constraint comprises a constraint to limit or disregard the portion of the first sensor data corresponding to the motion in the sideslip direction of the vehicle.

6. The method of claim 4, wherein the constraint comprises an assumption that a cross-track speed in the sideslip direction is zero.

7. The method of claim 3, further comprising:
identifying a direction of travel relative to the orientation of the vehicle as a forward direction; and
determining the constraint, in part, by determining the particular direction relative to the forward direction.

8. The method of claim 7, wherein determining the constraint further comprises:
calculating a covariance matrix based on the first sensor data;
calculating a singular value decomposition based on the covariance matrix; and
determining an estimate for the particular direction based on the calculated singular value decomposition.

9. The method of claim 2, further comprising, iteratively updating, using a filter, the constraint as the orientation of the device relative to the orientation of the vehicle is determined for additional sampling periods defined by the sampling interval.

10. A device, comprising:
a first sensor;
a second sensor; and
at least one processor configured to:
receive, with a sampling interval by the first sensor while the device is within or coupled to a vehicle in motion, a set of signals corresponding to location data; and
for at least one sampling period defined by the sampling interval,
obtain, by the second sensor, sensor data which corresponds to motion of the device during the at least one sampling period,
determine an orientation of the device relative to an orientation of the vehicle based on the sensor data, and
estimate a state of the device based at least in part on the orientation of the device relative to the orientation of the vehicle.

11. The device of claim 10, wherein determining the orientation of the device relative to the orientation of the vehicle comprises:
determining, based on the sensor data, a first device vector corresponding to a first direction relative to the orientation of the device;
determining a first vehicle vector corresponding to the first direction relative to the orientation of the vehicle;
determining, based on the sensor data, a second device vector corresponding to a second direction relative to the orientation of the device;
determining a second vehicle vector corresponding to the second direction relative to the orientation of the vehicle; and
determining the orientation of the device relative to the orientation of the vehicle based on the first device vector, the first vehicle vector, the second device vector and the second vehicle vector.

12. The device of claim 11, wherein the first direction is a direction of gravity, such that the first device vector corresponds to the direction of gravity relative to the orientation of the device, and the first vehicle vector corresponds to the direction of gravity relative to the orientation of the vehicle.

13. The device of claim 10, wherein the estimate is further based at least in part on a constraint on a portion of the sensor data corresponding to motion of the device in a particular direction.

14. The device of claim 13, wherein the particular direction is a sideslip direction of the vehicle.

15. The device of claim 14, wherein the constraint comprises a constraint to limit or disregard the portion of the sensor data corresponding to the motion in the sideslip direction of the vehicle.

16. A computer program product comprising code stored in a tangible computer-readable storage medium, the code comprising:
code to receive, at a sampling interval and by a device within or coupled to a vehicle in motion, a set of signals corresponding to location data; and
code to, for at least one sampling period defined by the sampling interval,
obtain first sensor data which corresponds to motion of the device during the at least one sampling period,
determine an orientation of the device relative to an orientation of the vehicle based on the first sensor data, and
estimate a state of the device based at least in part on the orientation of the device relative to the orientation of the vehicle.

17. The computer program product of claim 16, wherein the estimate is further based at least in part on a constraint on a portion of the first sensor data corresponding to motion of the vehicle in a sideslip direction of the vehicle.

18. The computer program product of claim 17, wherein the constraint comprises a constraint to limit or disregard the portion of the first sensor data corresponding to the motion in the sideslip direction of the vehicle.

19. The computer program product of claim 18, wherein the constraint comprises an assumption that a cross-track speed in the sideslip direction is zero.

20. The computer program product of claim 17, the code further comprising:
code to identify a direction of travel relative to the orientation of the vehicle as a forward direction; and
code to determine the constraint, in part, by determining a particular direction relative to the forward direction.

* * * * *